(12) United States Patent
Cheng et al.

(10) Patent No.: US 7,066,113 B2
(45) Date of Patent: Jun. 27, 2006

(54) COLLAR STRUCTURE FOR ANIMAL LEASHES

(76) Inventors: Yin Tsai Cheng, No. 69, Lane 149, Xibei St., Paisha Village, Huatan Shiang, Changhua Hsien (TW); Hsiu Yu Lai, No. 69, Lane 149, Xibei St., Paisha Village, Huatan Shiang, Changhua Hsien (TW)

( * ) Notice: Subject to any disclaimer, the term of this patent is extended or adjusted under 35 U.S.C. 154(b) by 0 days.

(21) Appl. No.: 10/984,813

(22) Filed: Nov. 10, 2004

(65) Prior Publication Data

US 2006/0096552 A1    May 11, 2006

(51) Int. Cl.
*A01K 27/00*    (2006.01)
*F16G 11/00*    (2006.01)

(52) U.S. Cl. ............... 119/863; 119/864; 24/115 H

(58) Field of Classification Search ............... 119/863, 119/792, 793, 795, 856, 797, 864, 865, 798; 24/712.1, 455, 712.9, 115 H, 163 R, 713.4, 24/713.6
See application file for complete search history.

(56) References Cited

U.S. PATENT DOCUMENTS

| | | | | |
|---|---|---|---|---|
| 205,515 | A * | 7/1878 | Culin | 119/862 |
| 2,520,325 | A * | 8/1950 | Moore | 403/209 |
| 2,616,394 | A * | 11/1952 | Elsinger | 119/864 |
| 2,743,702 | A * | 5/1956 | Sullivan | 119/864 |
| 2,798,458 | A * | 7/1957 | Odermatt | 119/858 |
| 3,011,478 | A * | 12/1961 | Kirby | 119/864 |
| 3,701,339 | A * | 10/1972 | Kemmerling | 119/864 |
| 3,872,833 | A * | 3/1975 | Herbert | 119/864 |
| 4,019,463 | A * | 4/1977 | Kitchen | 119/793 |
| 4,121,829 | A * | 10/1978 | Petrusek | 473/576 |
| 4,811,695 | A * | 3/1989 | Higgins | 119/864 |
| 4,974,549 | A * | 12/1990 | Gordon | 119/793 |
| 5,005,527 | A * | 4/1991 | Hatfield | 119/793 |
| 5,099,799 | A * | 3/1992 | Giacobbe | 119/793 |
| 5,365,641 | A * | 11/1994 | Watanabe et al. | 24/115 G |
| 5,497,733 | A * | 3/1996 | Hull et al. | 119/793 |
| 5,511,293 | A * | 4/1996 | Hubbard et al. | 24/442 |
| 5,701,848 | A * | 12/1997 | Tozawa | 119/797 |
| 5,711,255 | A * | 1/1998 | Rudolph | 119/793 |

(Continued)

*Primary Examiner*—Yvonne R. Abbott
(74) *Attorney, Agent, or Firm*—Troxell Law Office, PLLC

(57) ABSTRACT

A collar structure for animal leashes includes a lead having a hoop disposed at one end thereof for a ring to be attached thereto, and a clamping piece made up of a clamping plate protruding upwards at the top side of a fixing body and supported by a spring element wherein the clamping plate of the clamping piece is pushed downwards to align a pair of symmetrical left and right clamping holes disposed thereon with a pair of matching left and right fixing holes of the fixing body thereof, and a free end disposed at the other side of the lead thereof is sequentially guided through the left fixing hole and the left clamping hole thereof before extending further to wind around the other side of the ring thereof and bend backwards to pass through the right fixing hole and the right clamping hole thereof respectively so as to form a U-shaped adjustable section and a movable collar to fit an animal's neck. Therefore, via the clamping piece to clamp tight the lead for secure location thereof, the movable collar can be stably held in place in a properly adjusted size without getting tightened or loosened by the animal squirming or nuzzling therein so as to prevent the animal from getting choked or injured and avoid the risk of escape thereof, efficiently providing a more convenient and safer collar structure for use.

4 Claims, 5 Drawing Sheets

U.S. PATENT DOCUMENTS

| | | | |
|---|---|---|---|
| 5,713,308 A * | 2/1998 | Holt, Jr. | 119/856 |
| 5,735,234 A * | 4/1998 | May | 119/795 |
| 5,743,216 A * | 4/1998 | Holt, Jr. | 119/793 |
| 5,806,469 A * | 9/1998 | Cooper-Ratliff et al. | 119/805 |
| 5,893,339 A * | 4/1999 | Liu | 119/792 |
| 5,934,224 A * | 8/1999 | Sporn | 119/792 |
| 5,947,062 A * | 9/1999 | Hoffman et al. | 119/769 |
| 6,393,670 B1 * | 5/2002 | Bealmear | 24/129 R |
| 6,460,488 B1 * | 10/2002 | Manzella et al. | 119/798 |
| 6,619,238 B1 * | 9/2003 | Amato | 119/795 |
| 6,842,949 B1 * | 1/2005 | Warren | 24/135 N |
| 6,938,580 B1 * | 9/2005 | Herbst | 119/864 |

* cited by examiner

COLLAR STRUCTURE FOR ANIMAL LEASHES

BACKGROUND OF THE INVENTION

The present invention is related to a collar structure for animal leashes, including a lead having a hoop disposed at one end thereof for a ring to be attached thereto, and a clamping piece made up of a clamping plate protruding upwards at the top side of a fixing body and supported by a spring element wherein a free end disposed at the other side of the lead thereof is guided to pass through one side of the clamping piece and the ring respectively before extending backwards to come out through the other side of the clamping piece to form a U-shaped adjustable section and a movable collar to fit and wind around an animal's neck; whereby, via the clamping piece to clamp tight the lead for secure location, the movable collar can be stably held in place in a properly adjusted size so as to prevent the animal from getting choked or injured when squirming or nuzzling therein and avoid the risk of escape, efficiently providing a more convenient and safer collar structure for use.

Please refer to FIG. 1. A conventional collar structure for pets is made up of a lead 10 having a hoop 12 disposed at one end of a rope 11 to be attached to one side of a ring 13 wherein the other end of the rope 11 is wound around and guided through the other side of the ring 13 to form a movable collar 14 to fit a neck 21 of an animal 20 thereby. A movable limiting piece 15 is properly mounted at the lead 10 thereon to restrain the movement of the ring 13 and, thus, control the size of the movable collar 14 thereof.

The above conventional collar structure is featured by some disadvantages. Most of all, when the lead 10 is pulled to control the movement of the animal 20, the ring 13 capable of moving tends to slide towards the neck 21 of the animal 20 and tighten the movable collar 14 therewith to press tight against the neck 21 of the animal 20, which can easily injure or even choke the animal 20 guided by the lead 10 thereof.

Please refer to FIG. 2. A second conventional collar structure for pets includes a lead 10' made up of a rope 11' both ends of which are crisscrossed into S shapes at a D-ring 12' and respectively guided there-through to form a movable collar 13' at the front thereof to fit a neck 21 of an animal 20 wherein a retaining hoop 14' is mounted at one side of the D-ring 12' to restrain the movement of the D-ring 12' and, thus, control the size of the movable collar 13' thereby. A through hole 15' is disposed at the other side of the rope 11' for the registration of a ring 16' that can be snapped onto a hook 31 of a leash 30 thereby.

There are some drawbacks to the second conventional collar structure for pets. Especially, when the movable collar 13' of the lead 10' is fit to the neck 21 of the animal 20, the D-ring 12' can be easily pushed backwards to the retaining hoop 14' by the animal 20 constantly squirming or nuzzling at the movable collar 13' therein, and enlarge the closed space of the movable collar 13' thereby. Thus, the animal 20 can easily back out of the movable collar 13' and carelessly get escaped or lost.

SUMMARY OF THE PRESENT INVENTION

It is, therefore, the primary purpose of the present invention to provide a collar structure for animal leashes, including a lead having a hoop disposed at one end thereof for the attachment of a ring thereto, and a clamping piece made up of a clamping plate protruding upwards at the top side of a fixing body and supported by a spring element wherein a free end disposed at the other side of the lead thereof is guided to pass through one side of the clamping piece and the ring respectively before extending backwards to come out through the other side of the clamping piece to form a U-shaped adjustable section and a movable collar to fit and wind around an animal's neck thereby; whereby, via the clamping piece to clamp tight the lead thereof and the ring evenly pulled by the lead from both sides thereof, the movable collar can be stably held in place in a properly adjusted size so as to prevent the animal from getting choked or injured when squirming or nuzzling therein and avoid the risk of escape, efficiently providing a more convenient and safer collar structure for use.

DETAILED DESCRIPTION OF THE PREFERRED EMBODIMENTS

Figure 1:
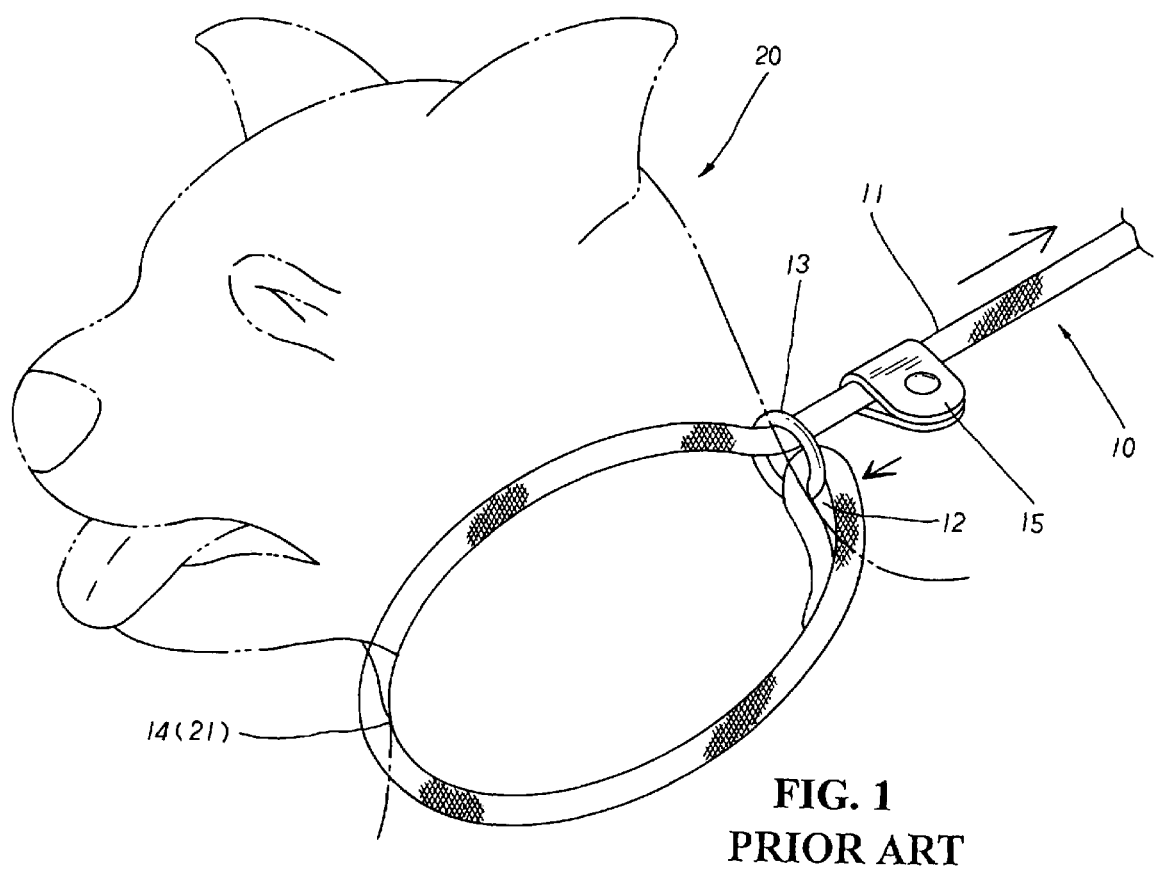
FIG. 1 is a perspective view of a conventional collar structure in practical use.
Figure 2:
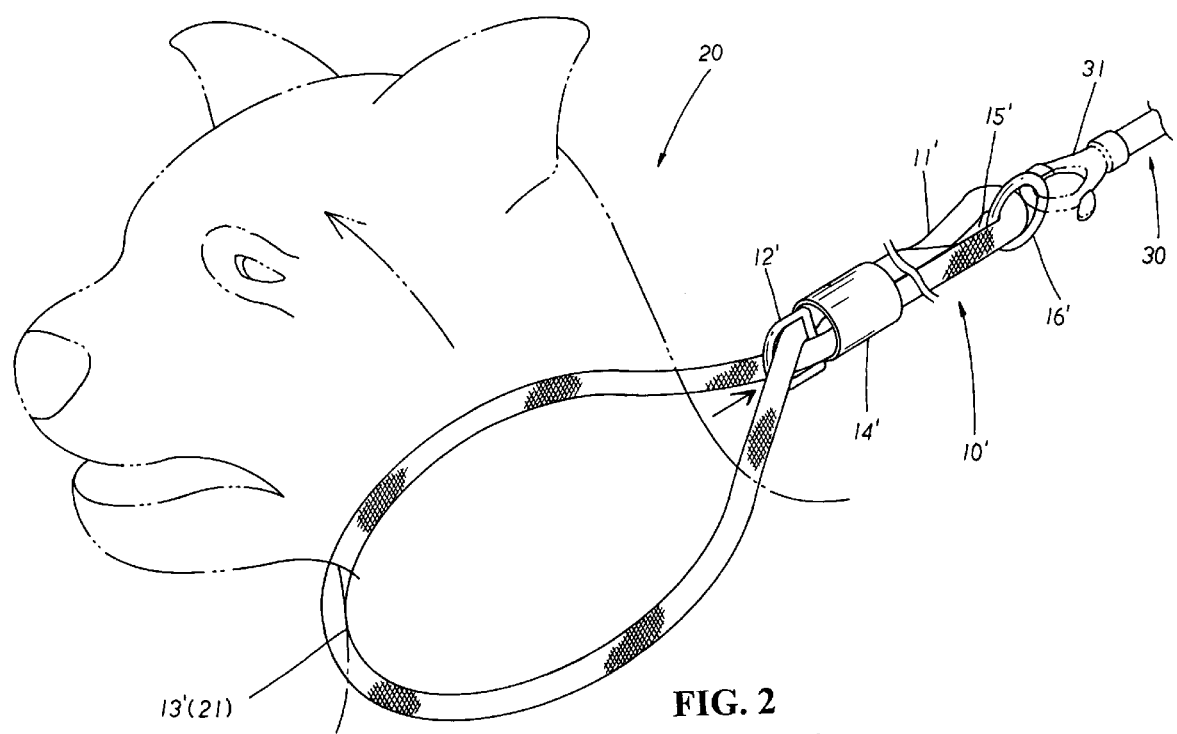
FIG. 2 is a perspective view of another conventional collar structure in practical use.
Figure 3:
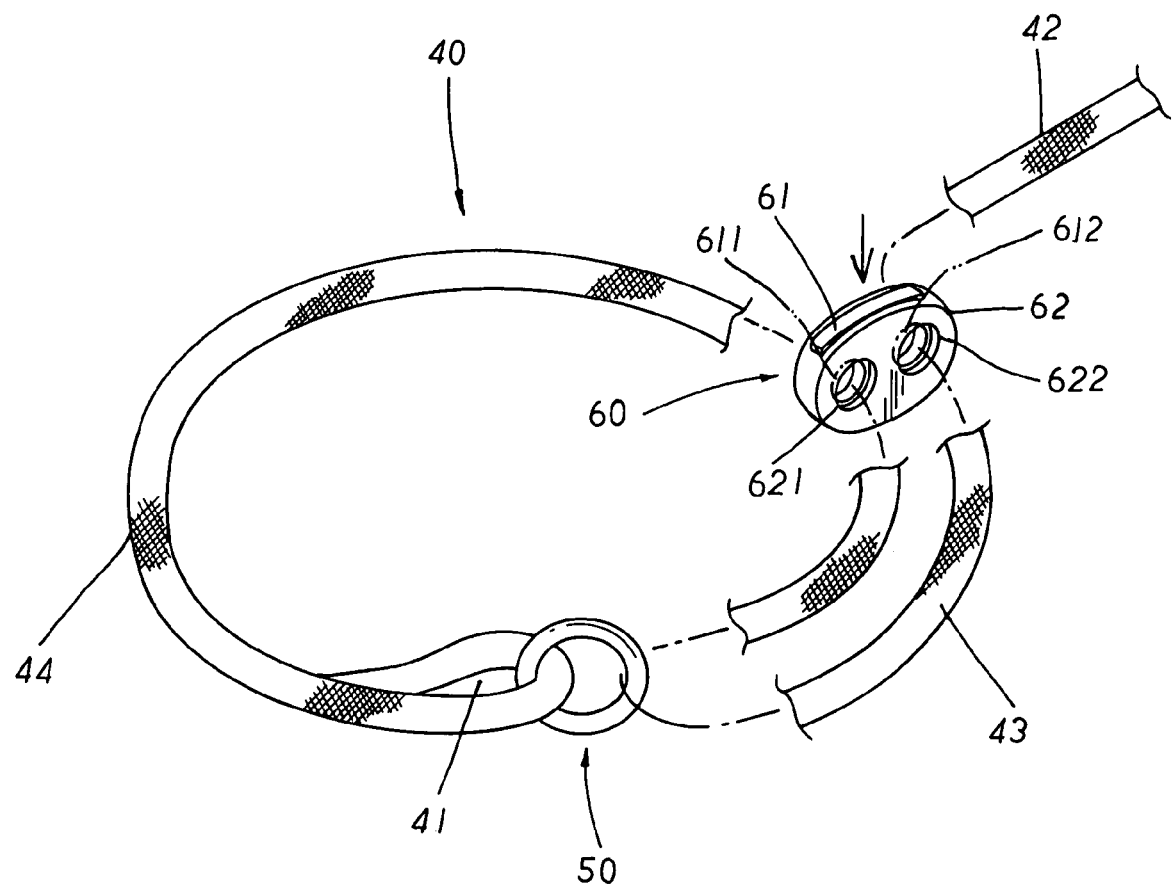
FIG. 3 is a perspective exploded view of the present invention.
Figure 4:
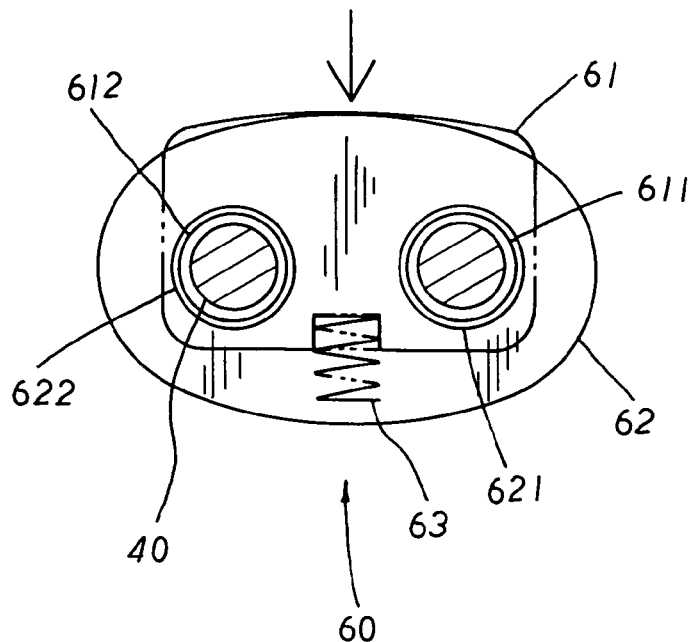
FIG. 4 is a cross sectional view of a clamping piece of the present invention in operation.
Figure 5:
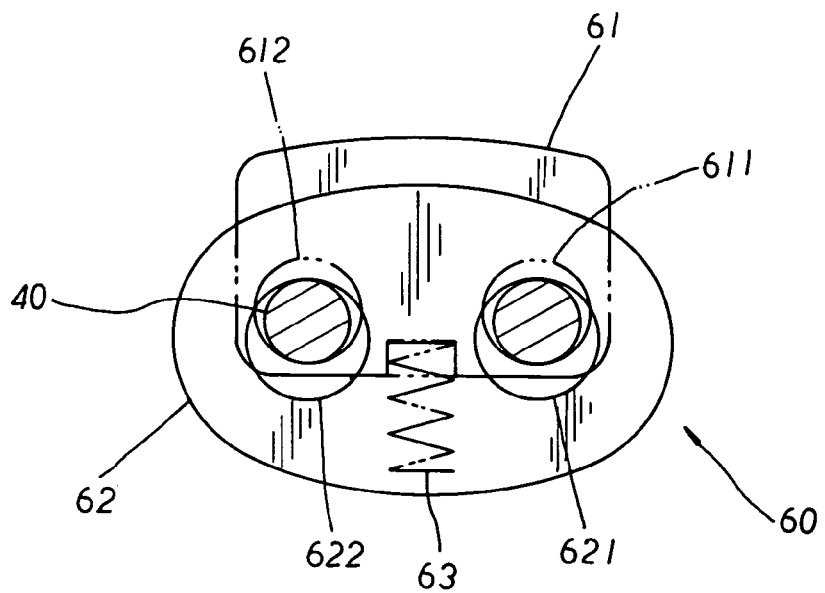
FIG. 5 is another cross sectional view of the clamping piece of the present invention in operation.
Figure 6:
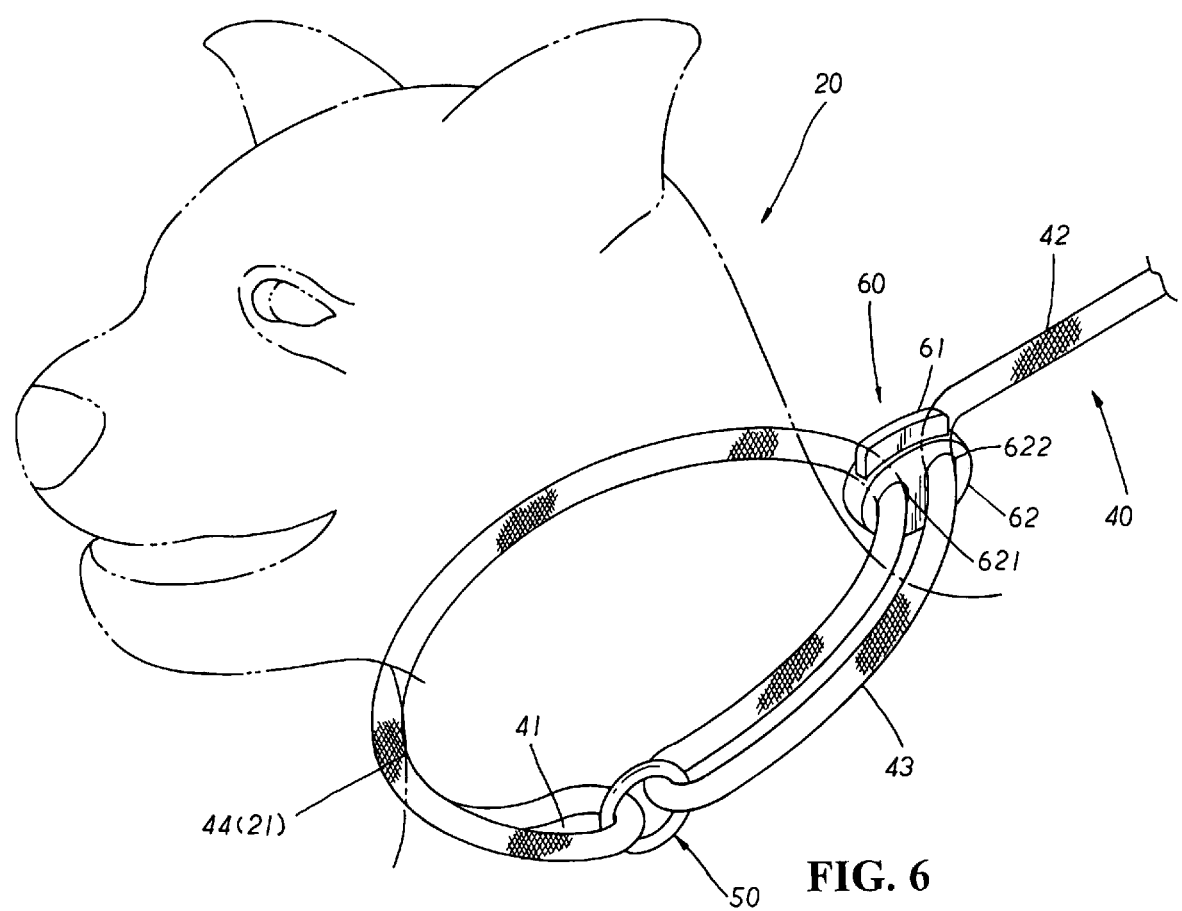
FIG. 6 is a perspective view of the present invention in practical use.

Please refer to FIGS. 2 to 3 inclusive. The present invention is related to a collar structure for animal leashes, including a lead 40 having a hoop 41 disposed at one end thereof for the attachment of a ring 50 thereto, and a clamping piece 60 made up of a clamping plate 61 protruding upwards at the top side of a fixing body 62 as shown in FIG. 5. The clamping plate 61 of the clamping piece 60 is pushed downwards to align a pair of symmetrical left and right clamping holes 611, 612 disposed thereon with a pair of matching left and right fixing holes 621, 622 of the fixing body 62 thereof as shown in FIG. 4. A free end 42 disposed at the other side of the lead 40 can be sequentially guided through the left fixing hole 621 of the fixing body 62 and the left clamping hole 611 of the clamping plate 61 before extending further to wind around the ring 50 thereof and bend backwards to pass through the right fixing hole 622 and the right clamping hole 612 thereof respectively so as to form a U-shaped and loop-like adjustable section 43 and a movable collar 44 to fit a neck 21 of an animal 20 as shown in FIG. 6. The clamping piece 60 is also equipped with a spring element 63 to support and push upwards the clamping plate 61 thereof, permitting the lead 40 to be clamped tight at the left/right clamping holes 611, 612 and the left/right fixing holes 621, 622 of the clamping plate 61 and the fixing body 62 thereof for secure location thereby.

In practical use, the ring 50 is evenly pulled by the lead 40 from both sides thereof without danger of dislocation, and the lead 40 is closely clamped tight by the clamping piece 60 thereof so as to securely hold in place the adjustable section 43 thereof in a certain adjusted length. Therefore, the movable collar 44 can be stably located in a proper size to fit and wind around the neck 21 of the animal 20 without getting tightened or loosened by the animal 20 squirming or nuzzling therein so as to prevent the animal 20 from getting choked or injured and avoid the risk of escape thereof. Besides, depending on the size of the animal 20, the clamping plate 61 of the clamping piece 60 is pushed downwards, permitting the adjustable section 43 and the free end 42 extending at one side of the clamping piece 60 to be properly pulled at both sides thereof so as to adjust the length of the adjustable section 43 and the size of the movable collar 44 therewith accordingly, efficiently providing a more convenient and safer collar structure for use thereof.

What is claimed is:

1. A collar structure comprising:
   a) a lead having a hoop located on a first end thereof;
   b) a ring, the hoop being connected to the ring;
   c) a clamping device having a fixing body having a first fixing body hole and a second fixing body hole,
   wherein a second end of the lead is threaded sequentially through the first fixing body hole, the ring, and the second fixing body hole forming an adjustable section between the ring and the clamping device, the second end of the lead extending outwardly from the clamping device.

2. The collar structure according to claim 1, wherein the clamping device includes a clamping plate inserted into the fixing body and is movable between first and second positions, the clamping plate having a first clamping plate hole and a second clamping plate hole, when the clamping plate is located in the first position, the first clamping plate hole aligning with the first fixing body hole and the second clamping plate hole aligning with the second fixing body hole allowing the lead to be adjusted, and, when the clamping plate is located in the second position, an interior portion of each of the first clamping plate hole, the first fixing body hole, the second hole clamping plate and the second fixing body hole engages a portion of the lead.

3. The collar structure according to claim 2, wherein the clamping device includes a spring element pressing the clamping plate toward the second position.

4. The collar structure according to claim 1, wherein the lead has an adjustable U-shaped middle portion located the ring and the clamping device.

* * * * *